US010063022B2

(12) United States Patent
Chen et al.

(10) Patent No.: US 10,063,022 B2
(45) Date of Patent: Aug. 28, 2018

(54) POWDER DISTRIBUTION UNIT

(71) Applicant: LITE-ON TECHNOLOGY CORP., Taipei (TW)

(72) Inventors: Shih-Ming Chen, Taipei (TW); Yong-Long Lee, Taipei (TW); Wen-Che Tsai, Taipei (TW); Kun-Ta Yang, Taipei (TW)

(73) Assignee: Lite-On Technology Corp., Taipei (TW)

( * ) Notice: Subject to any disclaimer, the term of this patent is extended or adjusted under 35 U.S.C. 154(b) by 358 days.

(21) Appl. No.: 15/160,131

(22) Filed: May 20, 2016

(65) Prior Publication Data

US 2017/0201095 A1 Jul. 13, 2017

(30) Foreign Application Priority Data

Jan. 8, 2016 (CN) .......................... 2016 1 0013792

(51) Int. Cl.

*H02J 3/00* (2006.01)
*H01R 25/00* (2006.01)
*H01R 13/70* (2006.01)
*H01R 103/00* (2006.01)

(52) U.S. Cl.

CPC ........... *H01R 25/003* (2013.01); *H01R 13/70* (2013.01); *H01R 2103/00* (2013.01)

(58) Field of Classification Search

None

See application file for complete search history.

(56) References Cited

U.S. PATENT DOCUMENTS

2005/0094336 A1* 5/2005 Cleveland ................ H02G 3/00 361/64
2009/0236909 A1* 9/2009 Aldag .................. H01R 25/142 307/39
2013/0062970 A1* 3/2013 Maier ........................ H02J 3/26 307/130
2013/0116846 A1* 5/2013 Galsim ................... G06F 1/266 700/295

* cited by examiner

*Primary Examiner* — Jared Fureman
*Assistant Examiner* — Joel Barnett
(74) *Attorney, Agent, or Firm* — Rosenberg, Klein & Lee

(57) ABSTRACT

A power distribution unit is connected to a three-phase electric power source having three phase wires with different phases, and includes a socket and a switch. The socket has a first socket terminal connected to one of the phase wires, and a second socket terminal. The switch includes a first switch terminal connected to another one of the phase wires, a second switch terminal connected to a neutral, and a third switch terminal connected to the second socket terminal. By selectively connecting the third and the first switch terminals, or connecting the third and the second switch terminals, a line-to-neutral voltage or a line-to-line voltage from the three-phase electric power source is outputted by the socket.

17 Claims, 8 Drawing Sheets

POWDER DISTRIBUTION UNIT

CROSS-REFERENCE TO RELATED APPLICATION

This application claims priority of Chinese Application No. 201610013792.5, filed on Jan. 8, 2016.

FIELD

The disclosure relates to a power distribution unit, and more particularly to a power distribution unit capable of outputting an output voltage signal with various selectable voltages.

BACKGROUND

For power supply and distribution to multiple computers and servers in a data center, a conventional power distribution unit (PDU) is utilized to distribute electric power. Depending on the area or the country where the data center is located, specification of the mains electricity provided to the data center may vary. Therefore, the conventional PDU is designed according to the specification of the mains electricity. For example, the mains electricity in North America is three-phase electric power, using five-wire outlets to provide a line-to-neutral voltage of 120 V and a line-to-line voltage of 208 V.

However, the conventional PDU is limited to outputting electricity through its sockets in only one of the following three configurations: (1) with all of the sockets outputting the line-to-neutral voltage, (2) with all of the sockets outputting the line-to-line voltage, and (3) with a fixed number of the sockets outputting the line-to-neutral voltage and the remaining sockets outputting the line-to-line voltage. Namely, each of the sockets of the conventional PDU can output either the line-to-line voltage or the line-to-neutral voltage. In the case of a data center where most of the computers require the line-to-neutral voltage and only a few require the line-to-line voltage, either the conventional PDUs with configurations (1) and (2), or only the conventional PDUs with the configuration (3) can be used. Unfortunately, in this way, usage of the conventional PDU(s) is inefficient because most of the sockets outputting the line-to-line voltage would not be utilized.

SUMMARY

One object of the disclosure is to provide a power distribution unit that is capable of outputting an output voltage signal with various selectable voltages.

The power distribution unit is configured to be electrically connected to a three-phase electric power source that has three phase wires with respective different phases. The power distribution unit includes at least one branch unit including at least one socket, and at least one switch unit including a switch.

The socket has a first socket terminal that is configured to be electrically connected to one of the phase wires, and a second socket terminal.

The switch includes a first switch terminal that is configured to be electrically connected to another one of the phase wires, a second switch terminal that is configured to be electrically connected to a neutral, and a third switch terminal that is electrically connected to the second socket terminal.

The switch is operable to establish one of a first electrical connection between the third switch terminal and the first switch terminal to transmit a line-to-line voltage from the three-phase electric power source to the socket, and a second electrical connection between the third switch terminal and the second switch terminal to transmit a line-to-neutral voltage from the three-phase electric power source to the socket. The socket is configured to output one of the line-to-neutral voltage and the line-to-line voltage as the output voltage signal.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
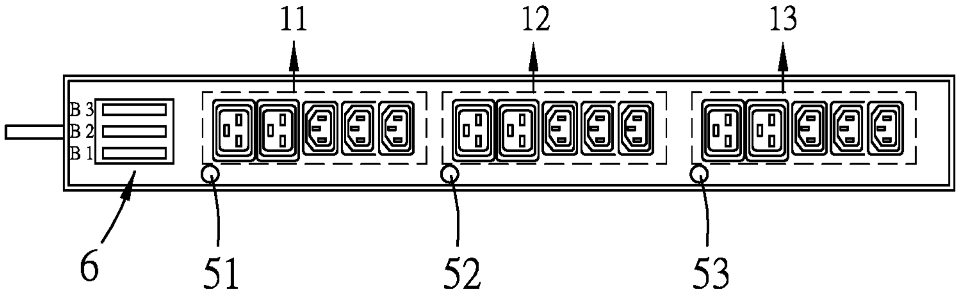
FIG. 1 is a schematic diagram illustrating a first embodiment of a power distribution unit according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
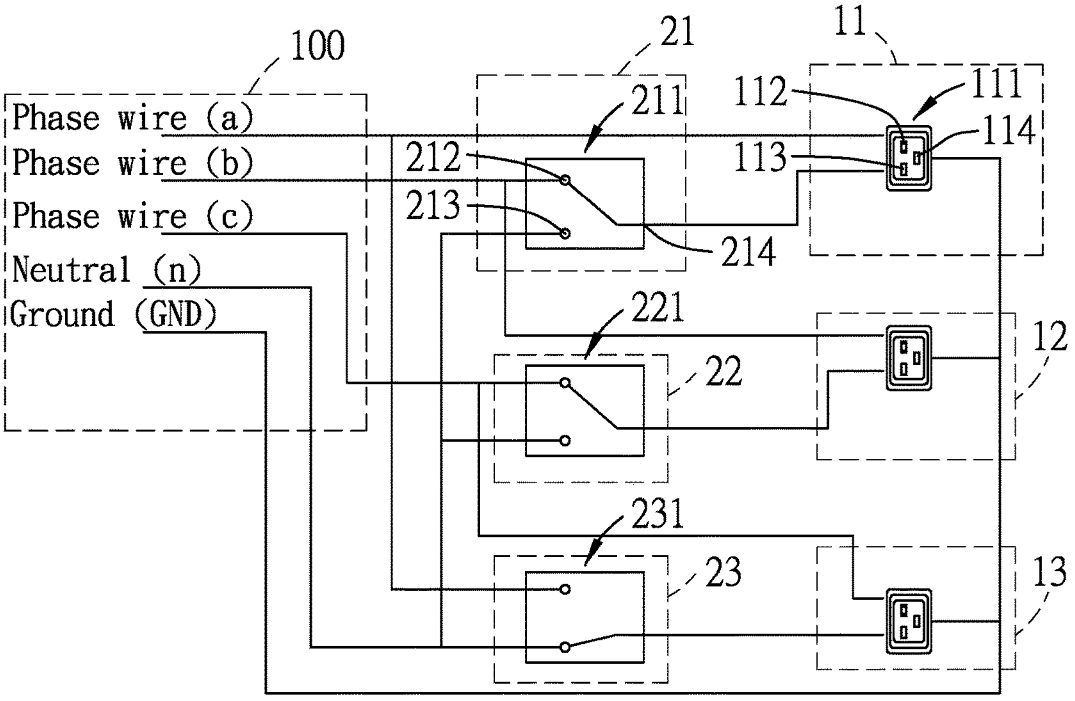
FIG. 2 is a schematic diagram illustrating the first embodiment of the power distribution unit.

Referring to FIGS. 1 to 2, the first embodiment of the power distribution unit (PDU) according to the disclosure is illustrated. The PDU is capable of outputting an output voltage signal with various selectable voltages, and is configured to be electrically connected to a three-phase electric power source 100 that has five wires, i.e., three phase wires (a, b and c) with respective different phases, a neutral (n) and a ground (GND), for receiving input voltages (Va, Vb and Vc) from the phase wires (a, b and c). The PDU includes three branch units 11-13, three switch units 21-23, three output voltage indicators 51-53, and a user interface 6.

The branch units 11-13 have similar configuration, and each of the branch units 11-13 includes multiple sockets. Only one of the sockets of each of the branch units 11-13 will be illustrated in FIG. 2. Each socket of the branch units 11-13 has a first socket terminal configured to be electrically connected to one of the phase wires (a, b and c) for receiving a corresponding one of the input voltages (Va, Vb and Vc) therefrom, a second socket terminal, and a third socket terminal configured to be electrically connected to the ground (GND). For example, one socket 111 of the branch unit 11 has a first socket terminal 112 configured to be electrically connected to the phase wire (a) for receiving the input voltage (Va), a second socket terminal 113, and a third socket terminal 114 configured to be electrically connected to the ground (GND).

The switch units 21-23 have similar configuration. The switch units 21-23 respectively correspond to the branch units 11-13, and respectively include first switches 211, 221, and 231. Each of the first switches 211, 221, and 231 includes a first switch terminal, a second switch terminal and a third switch terminal. The first switch terminal is configured to be electrically connected to another one of the phase wires (a, b and c) other than the one of the phase wires (a, b and c) to which the first socket terminal of each socket of a corresponding one of the branch units 11-13 is connected. The second switch terminal is configured to be electrically connected to the neutral (n). The third switch terminal is electrically connected to the second socket terminal of each socket of the corresponding one of the branch units 11-13. For example, the switch unit 21 corresponds to the branch unit 11, and the first switch 211 of the switch unit 21 includes a first switch terminal 212 configured to be electrically connected to another phase wire (b) for receiving the input voltage (Vb), a second switch terminal 213 configured to be electrically connected to the neutral (n), and a third switch terminal 214 electrically connected to the second socket terminal 113 of the branch unit 11. In this embodiment, each of the first switches 211, 221 and 231 is a manual mechanical switch, and more specifically, is one of a single-pole double-throw switch, a rotary switch and a dual in-line package switch.

Each of the first switches 211, 221 and 231 is operable to establish one of a first electrical connection between the third switch terminal and the first switch terminal to transmit a line-to-line voltage from the three-phase electric power source 100 to the sockets of the corresponding one of the branch units 11-13, and a second electrical connection between the third switch terminal and the second switch terminal to transmit a line-to-neutral voltage from the three-phase electric power source 100 to the sockets of the corresponding one of the branch units 11-13. Accordingly, the sockets are configured to output one of the line-to-neutral voltage and the line-to-line voltage as the output voltage signal.

For example, a user may manipulate the user interface 6 to operate the first switch 211 of the switch unit 21 for establishing the first electrical connection between the third switch terminal 214 and the first switch terminal 212, such that the second socket terminal 113 of the socket 111 is electrically connected to the phase wire (b) and the socket 111 outputs the line-to-line voltage (Vab), e.g., 208 volts in the specification in North America, as the output voltage signal. On the other hand, when the user manipulates the user interface 6 to operate the first switch 211 for establishing the second electrical connection between the third switch terminal 214 and the second switch terminal 213, the socket 111 outputs the line-to-neutral voltage (Van), e.g., 120 volts in the specification in North America, as the output voltage signal.

Similarly, by operating the first switch 221 of the switch unit 22, one of the line-to-neutral voltage (Vbn) and the line-to-line voltage (Vbc) is outputted by the sockets of the branch unit 12; by operating the first switch 231 of the switch unit 23, one of the line-to-neutral voltage (Vcn) and the line-to-line voltage (Vca) is outputted by the sockets of the branch unit 13. Therefore, the voltage of the output voltage signal outputted by the sockets of one of the branch units 11-13 may be different from the voltage of the output voltage signal outputted by the sockets of another one of the branch units 11-13 depending on the user's selections. For example, all sockets of the branch units 11-13 output the line-to-line voltages (Vab, Vbc and Vca), respectively, or output the line-to-neutral voltages (Van, Vbn and Vcn), respectively. Furthermore, the sockets of the branch units 11-12 may output the line-to-line voltages (Vab and Vbc), respectively, while the sockets of the branch unit 13 output the line-to-neutral voltage (Vcn).

The output voltage indicators 51-53 correspond to the branch units 11-13, respectively. Each of the output voltage indicators 51-53 is configured to respectively indicate whether the output voltage signal outputted by a corresponding one of the branch units 11-13 is the line-to-neutral voltage or the line-to-line voltage with respective different colors. In this embodiment, the output voltage indicators 51-53 are light-emitting diode (LED) indicators. For example, when the output voltage signal of the branch unit 11 is the line-to-line voltage (Vab) (i.e., high voltage), the output voltage indicator 51 emits red light; similarly, when the output voltage of the branch unit 11 is the line-to-neutral voltage (Van) (i.e., low voltage), the output voltage indicator 51 emits green light.

It should be noted that in this embodiment, a number of the branch units 11-13 and a number of the switch units 21-23 are both three. However, the numbers of the branch units 11-13 and the switch units 21-23 are not limited to the disclosure in this embodiment, and could be one or more than one depending on actual demand. A number of the sockets of each branch unit 11-13 also depends on actual demand. By wiring additional circuits in parallel with the three-phase electric power source 100, the number of the sockets may be increased. Furthermore, in this embodiment, the line-to-neutral voltage (Van, Vbn and Vcn) and the line-to-line voltage (Vab, Vbc and Vca) are 120 volts and 208 volts, respectively. However, the line-to-neutral voltage (Van, Vbn and Vcn) and the line-to-line voltage (Vab, Vbc and Vca) may be, for example, 277 V and 480 V or 230 V and 400 V according to specification of the mains electricity.

Figure 3:
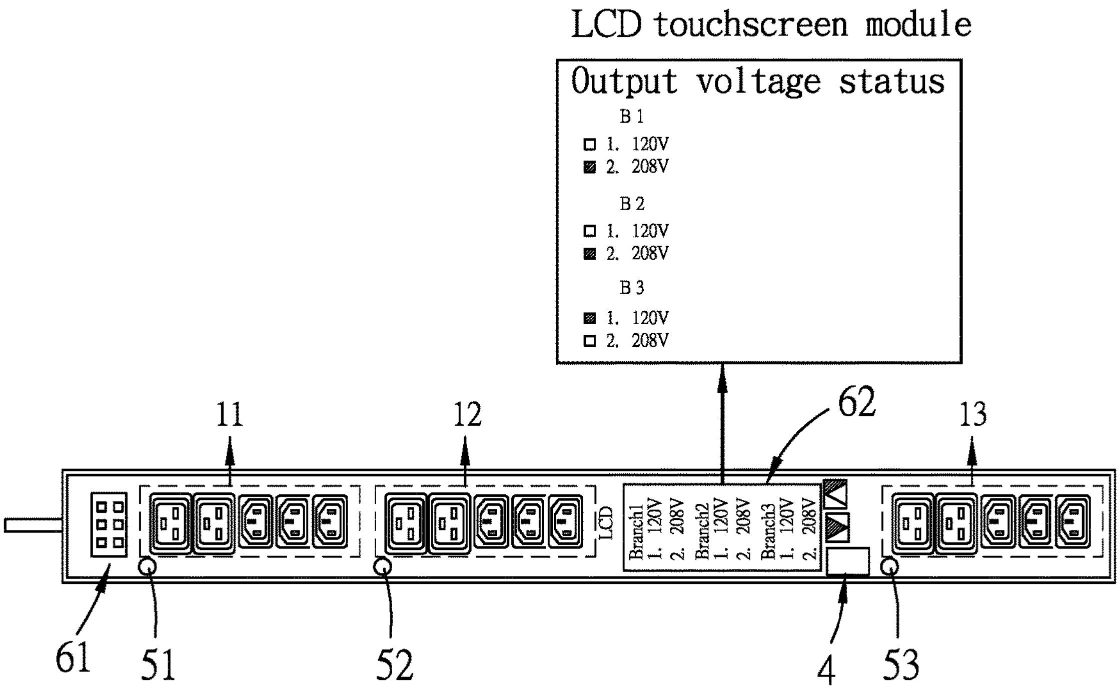
FIG. 3 is a schematic diagram illustrating a second embodiment of the power distribution unit according to the disclosure.
Figure 4:
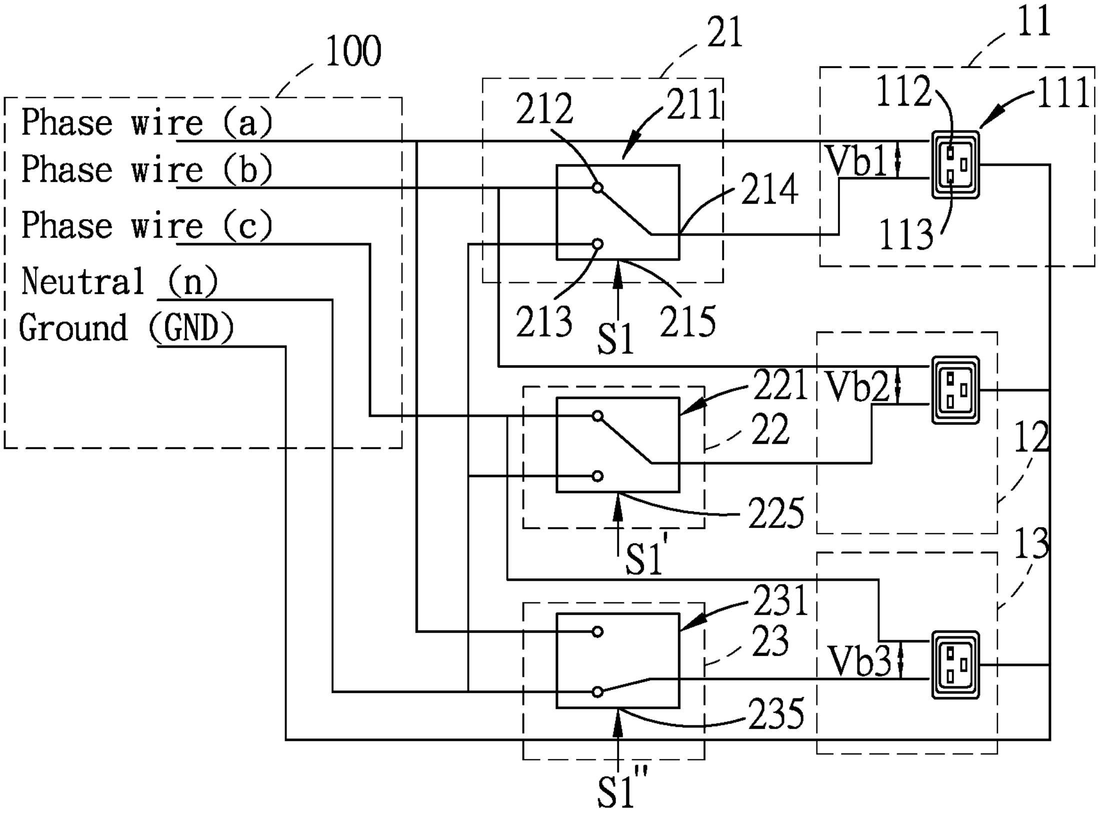
FIG. 4 is a schematic diagram illustrating the second embodiment of the power distribution unit.
Figure 5:
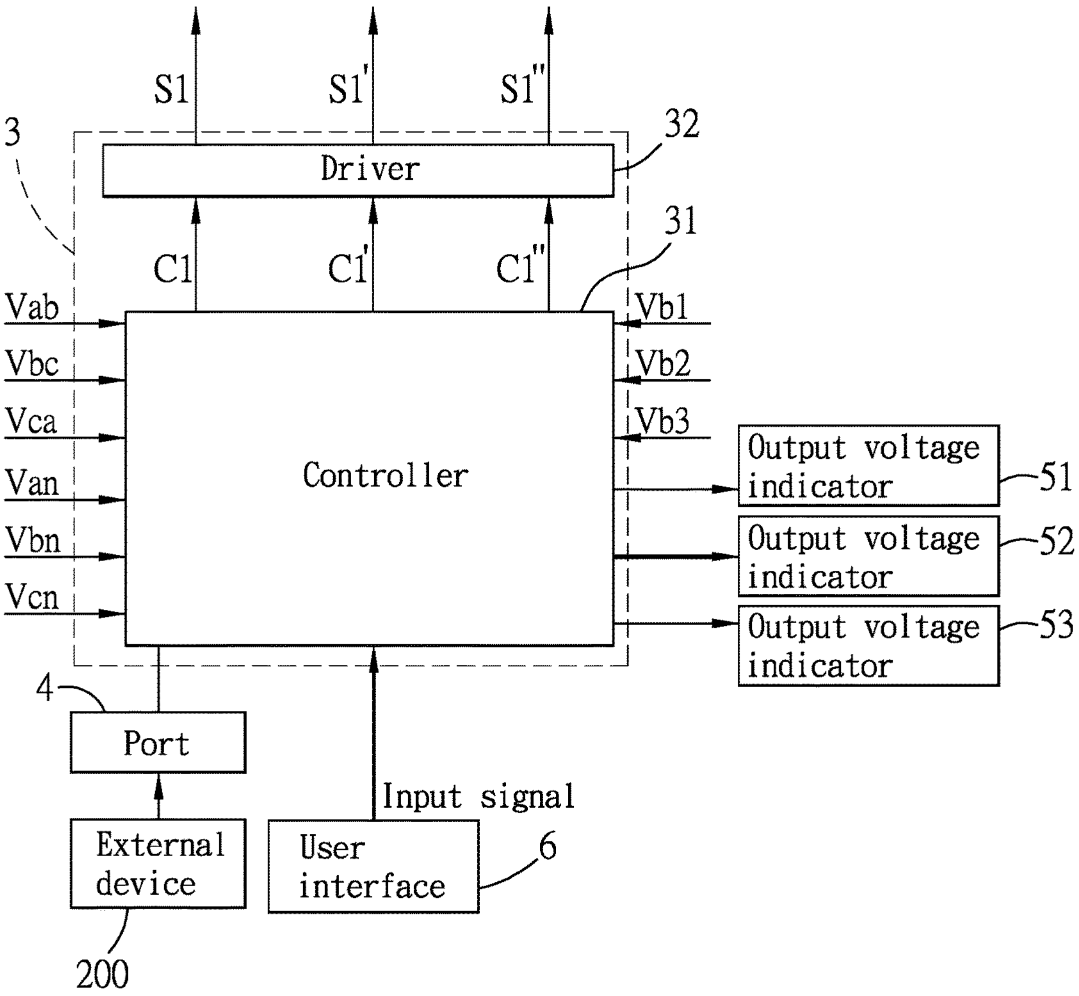
FIG. 5 is a block diagram illustrating operation of a processing unit of the second embodiment.
Figure 6:
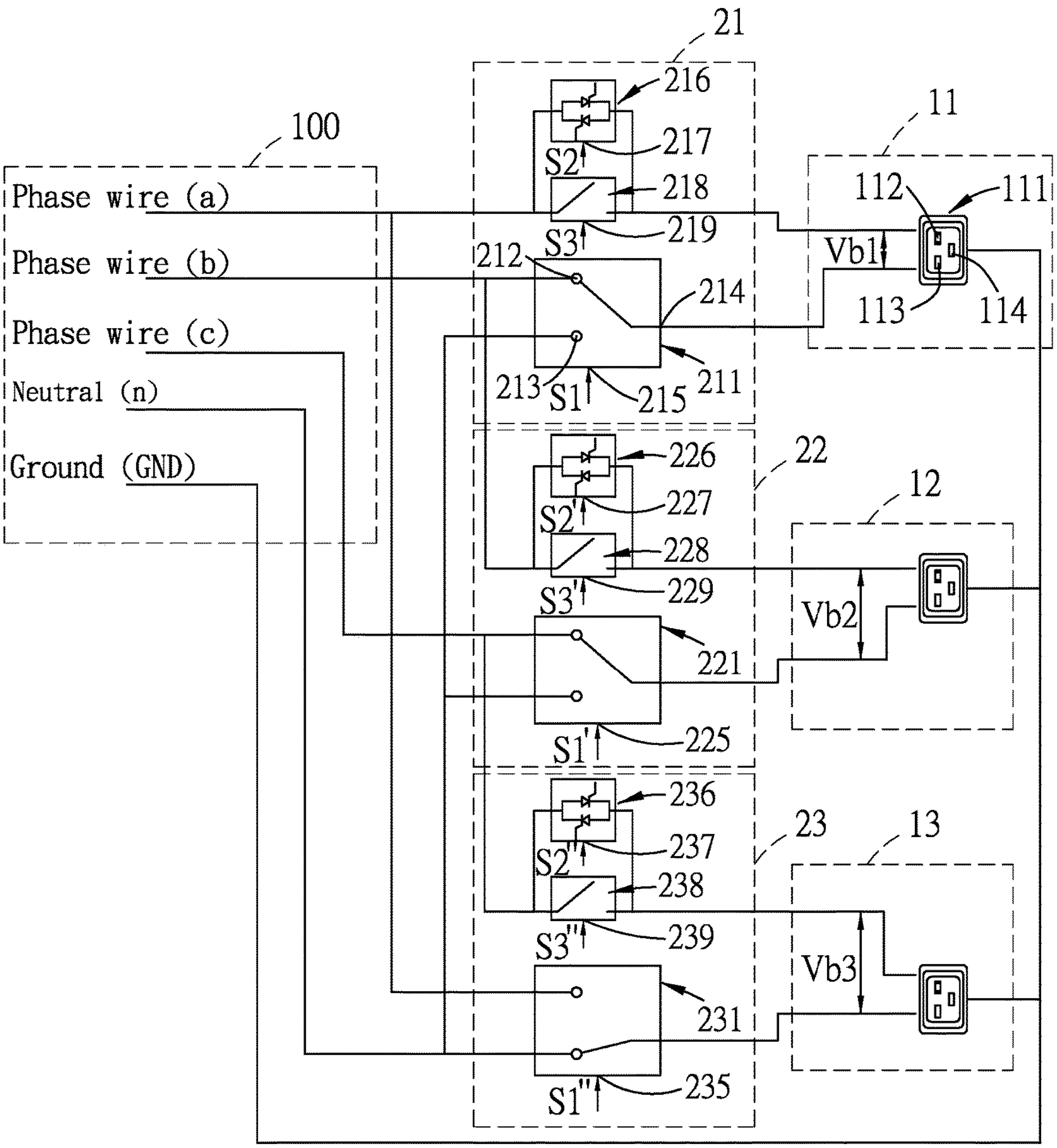
FIG. 6 is a schematic diagram illustrating a third embodiment of the power distribution unit according to the disclosure.

Referring to FIGS. 3 to 5, the second embodiment of the power distribution unit according to the disclosure is illustrated. The second embodiment is similar to the first embodiment, and is different from the first embodiment in that the PDU of the second embodiment further includes a processing unit 3 and a port 4. In this embodiment, the user interface 6 is electrically connected to the processing unit 3, includes a keyboard 61 and a touchscreen module 62, and is user operable to generate an input signal indicating a desired one of the line-to-neutral voltage and the line-to-line voltage for each of the branch units 11-13 and to transmit the input signal to the processing unit 3. The touchscreen module is configured to display a selection menu having respective options of the line-to-neutral voltage and the line-to-line voltage.

The processing unit 3 is configured to receive the input signal from the user interface 6, and to generate first drive signals (S1, S1' and S1") respectively for the switch units 21-23 according to the input signal.

The first switches 211, 221 and 231 further include first control terminals 215, 225 and 235, respectively. The first control terminals 215, 225 and 235 are electrically connected to the processing unit 3 for respectively receiving the first drive signals (S1, S1' and S1") therefrom. The first switches 211, 221 and 231 are operable respectively according to the first drive signals (S1, S1' and S1") to establish one of the first electrical connection and the second electrical connection. For example, the first control terminal 215 of the first switch 211 of the switch unit 21 is configured to receive the first drive signal (S1) to establish one of the first electrical connection between the third switch terminal 214 and the first switch terminal 212, and the second electrical connection between the third switch terminal 214 and the second switch terminal 213.

The processing unit 3 includes a controller 31 and a driver 32. The user interface 6 is electrically connected to the controller 31, and is configured to transmit the input signal to the controller 31. The controller 31 is configured to receive the input signal and to generate according to the input signal first control signals (C1, C1' and C1") that are associated with the switch units 21-23, respectively. The driver 32 is electrically connected to the controller 31 and the first control terminals 215, 225 and 235 of the first switches 211, 221 and 231, and is configured to receive the first control signals (C1, C1' and C1") from the controller 31, to generate the first drive signals (S1, S1' and S1") respectively according to the first control signals (C1, C1' and C1"), and to output the first drive signals (S1, S1' and S1") respectively to the first control terminals 215, 225 and 235. It should be noted that, since voltage/current of the first control signals (C1, C1' and C1") generated by the controller 31 are insufficient for driving the first switches 211, 221, 231, the driver 32 is configured to amplify the first control signals (C1, C1' and C1") to generate the first drive signals (S1, S1' and S1") for driving the first switches 211, 221, 231.

Furthermore, the controller 31 is electrically connected to the phase wires (a, b and c) and the neutral (n) of the three-phase electric power source 100 to get all possible line-to-neutral voltages and the line-to-line voltages, i.e., the line-to-neutral voltages (Van, Vbn and Vcn), and the line-to-line voltages (Vab, Vbc and Vca) in this embodiment. Accordingly, the controller 31 is operable, in response to receipt of the input signal, to analyze the input signal to determine the desired ones of the line-to-line voltages (Vab, Vbc and Vca) and the line-to-neutral voltages (Van, Vbn and Vcn) indicated by the input signal, and to generate the first control signals (C1, C1' and C1") according to the analysis on the input signal.

Moreover, the output voltage indicators 51-53 are electrically connected to the controller 31. The controller 31 is electrically connected to the first and second socket terminals of the sockets of the branch units 11-13 for respectively detecting detected voltages (Vb1, Vb2 and Vb3) between the first and second socket terminals. The controller 31 is further configured to control the output voltage indicators 51-53 to indicate voltage values of the output voltage signals outputted by the sockets of the branch units 11-13 according to the detected voltages (Vb1, Vb2 and Vb3) with specific colors.

For example, the user operates the user interface 6, i.e., one of the keyboard 61 and the touchscreen module 62, to generate the input signal indicating that a desired output voltage signal at the socket 111 of the branch unit 11 is the line-to-line voltage (Vab) (i.e., 208 volts). The controller 31 receives the input signal, and generates the first control signal (C1). The driver 32 generates the first drive signal (S1) by amplifying the first control signal (C1), and transmits the first drive signal (S1) to the first control terminal 215 of the first switch 211 of the switch unit 21. As a result, the first electrical connection between the third switch terminal 214 and the first switch terminal 212 is established. Meanwhile, the controller 31 detects the detected voltage (Vb1) between the first socket terminal 112 and the second socket terminal 113 of the socket 111 of the branch unit 11, and controls the output voltage indicator 51, i.e., the LED indicator, to indicate the voltage value of the output voltage signal (i.e., the line-to-line voltage (Vab)) according to the detected voltage (Vb1) with red light.

Referring to FIG. 5, the port 4 is electrically connected to the controller 31, and is configured to be coupled to an external device 200 which outputs the input signal and to transmit the input signal to the controller 31. For example, the external device 200 is a remote computer configured to be connected to the port 4 by a wired or wireless connection, and to transmit the input signal through the port 4 to the controller 31. By operating the computer installed with a specialized program provided by a manufacturer of the PDU, the user can know selectable output voltages provided by the sockets of the branch units 11-13, and can generate an input signal to make the socket 111 of the branch unit 11 output the line-to-line voltage (Vab). Upon receipt of the input signal, the controller 31 controls the driver 32 to output the first drive signal (S1) to the first control terminal 215. Consequently, the first electrical connection between the third switch terminal 214 and the first switch terminal 212 of the first switch 211 is established. In this way, the user can conveniently operate the PDU not only through the user interface 6, but also through the external device 200 (i.e., the remote computer) coupled to the port 4.

Similarly, the first control terminal 225 of the first switch 221 of the switch unit 22 is configured to receive the first drive signal (S1'). The first control terminal 235 of the first switch 231 of the switch unit 23 is configured to receive the first drive signal (S1"). Upon receipt of the input signal generated by the user operating the PDU through one of the keyboard 61, the LCD touchscreen module 62 and the external device 200, the controller 31 generates the control signals (C1' and C1") and transmits the same to the driver 32. Consequently, the driver 32 amplifies the control signals (C1' and C1") to generate the first drive signals (S1' and S1"), respectively, and transmits the first drive signals (S1' and S1") to the first control terminals 225 and 235, respectively.

Referring to FIGS. 6-9, the third embodiment of the power distribution unit according to the disclosure is illustrated. The third embodiment is similar to the second embodiment, and is different from the second embodiment in the switch units 21-23. In the third embodiment, the first switches 211, 221 and 231 of the switch units 21-23 are relay switches, and each of the switch units 21-23 further includes a second switch 216, 226, 236 and a third switch 218, 228, 238. The second switch 216, 226, 236 and the third switch 218, 228, 238 of each of the switch units 21-23 are electrically connected to each other in parallel. In addition, each parallel connection of the second switch 216, 226, 236 and the third switch 218, 228, 238 is configured to be electrically connected between one of the phase wires (a, b and c) and the first socket terminal of the socket of the corresponding one of the branch units 11-13. In this embodiment, each of the second switches 216, 226 and 236 includes two silicon controlled rectifiers. However, in other embodiments, each of the second switches 216, 226 and 236 may include two metal-oxide-semiconductor field-effect transistors (MOSFETs).

Each of the second switches 216, 226 and 236 is operable to establish an electrical connection between a connected one of the phase wires (a, b and c) and the first socket terminal to transmit the line-to-line voltage from the three-phase electric power source 100 to the socket of the corresponding one of the branch units 11-13. The second switches 216, 226 and 236 respectively include second control terminals 217, 227 and 237 electrically connected to the driver 32 for respectively receiving second drive signals (S2, S2' and S2") therefrom, and are configured to be respectively conducted in response to receipt of the second drive signals (S2, S2' and S2"). For example, the second switch 216 is conducted in response to receipt of the second drive signal (S2) at the second control terminal 217, and then establishes an electrical connection between the phase wire (a) and the first socket terminal 112 of the socket 111 of the branch unit 11.

Each of the third switches 218, 228 and 238 is operable to establish another electrical connection between the connected one of the phase wires (a, b and c) and the first socket terminal to transmit the line-to-line voltage from the three-phase electric power source 100 to the socket. The third switches 218, 228 and 238 are relay switches, and respectively include third control terminals 219, 229 and 239 electrically connected to the driver 32 for respectively receiving third drive signals (S3, S3' and S3") therefrom. Each of the third switches 218, 228 and 238 is configured to be conducted in response to receipt of the third drive signal (S3, S3', S3") after the socket outputs the output voltage signal. For example, the third switch 218 is connected in parallel to the second switch 216, and is conducted after the socket 111 outputs the output voltage signal in response to receipt of the third drive signal (S3) at the third control terminal 219, and then establishes the electrical connection between the phase wire (a) and the first socket terminal 112 of the socket 111 of the branch unit 11.

The controller 31 is electrically connected to the three-phase electric power source 100 for detecting the line-to-line voltages (Vab, Vbc and Vca) and the line-to-neutral voltages (Van, Vbn and Vcn) outputted by the three-phase electric power source 100. Furthermore, the controller 31 is electrically connected to the first and second socket terminals of the sockets of the branch units 11-13 for respectively detecting the detected voltages (Vb1, Vb2 and Vb3) between the first and second socket terminals. The controller 31 is configured to generate the second control signals (C2, C2' and C2") respectively according to the input voltages (Va, Vb and Vc) from the phase wires (a, b and c), and to generate third control signals (C3, C3' and C3") respectively according to the detected voltages (Vb1, Vb2 and Vb3).

The driver 32 is further electrically connected to the third control terminals 219, 229 and 239 of the third switches 218, 228 and 238, and to the second control terminals 216, 226 and 236 of the second switches 217, 227 and 237. In addition, the driver 32 is further configured to receive the second signals (C2, C2' and C2") and the third control signals (C3, C3' and C3") from the controller 31, and to generate the second drive signals (S2, S2' and S2") and the third drive signals (S3, S3' and S3") by amplifying the second control signals (C2, C2' and C2") and the third control signals (C3, C3' and C3"), respectively. Then, the driver 32 transmits the second drive signals (S2, S2' and S2") and the third drive signals (S3, S3' and S3") respectively to the third control terminals 219, 229 and 239 of the third switches 218, 228 and 238, and to the second control terminals 216, 226 and 236 of the second switches 217, 227 and 237.

Figure 7:
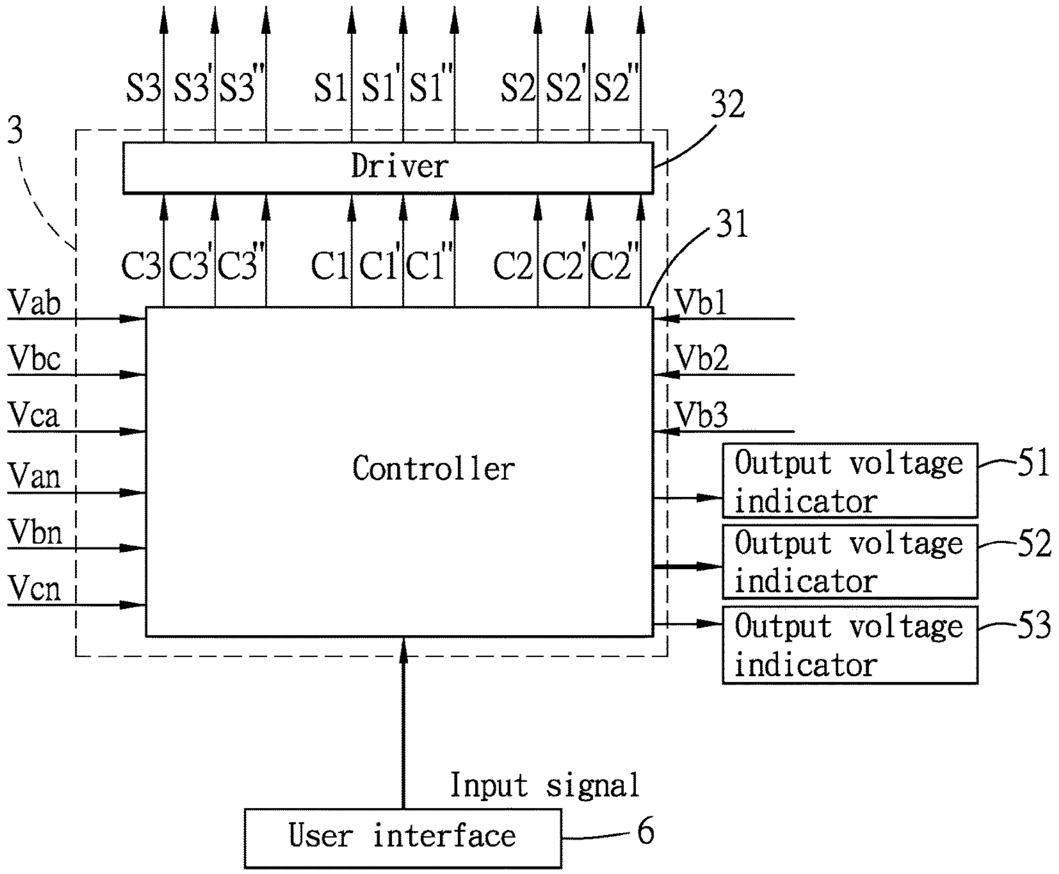
FIG. 7 is a block diagram illustrating operation of a processing unit of the third embodiment.
Figure 8:
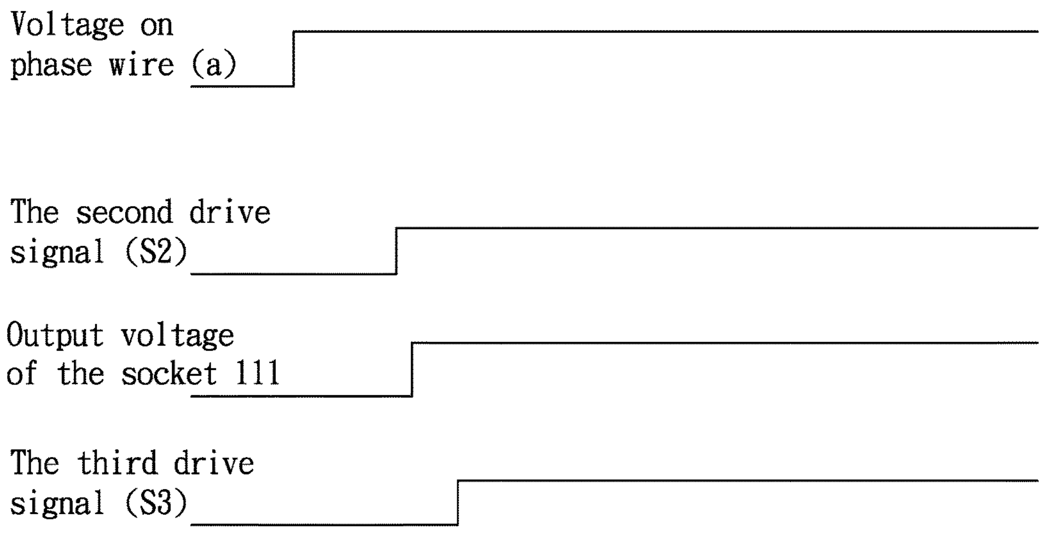
FIGS. 8 and 9 are timing diagrams illustrating drive signals outputted by the processing unit of the third embodiment.

Referring to FIGS. 7 and 8, for example, after the user operates the user interface 6 to generate the input signal for outputting the line-to-line voltage (Vab) (i.e., 208 volts) at the socket 111 of the branch unit 11, the controller 31 receives the input signal, analyzes the input signal to generate the first control signal (C1), and outputs the first control signal (C1) to the driver 32. The driver 32 generates the first drive signal (S1) by amplifying the first control signal (C1) and transmits the first drive signal (S1) to the first control terminal 215 of the first switch 211, thus allowing the electrical connection between the third switch terminal 214 and the first switch terminal 212 of the first switch 211 to be established. Moreover, the controller 31 generates the second control signal (C2) with a delay attributed to operation time of the first switch 211 that is a relay switch. The driver 32 amplifies the second control signal (C2) to generate the second drive signal (S2), and transmits the second drive signal (S2) to the second control terminal 217 of the second switch 216, so that the second switch 216 is conducted. Then, the first socket terminal 112 and the second socket terminal 113 of the socket 111 receives the input voltages (Va and Vb), respectively, and thus, the socket 111 outputs the line-to-line voltage (Vab) as the output voltage signal (i.e. the detected voltage (Vb1)).

After detecting the detected voltage (Vb1), the controller 31 generates the third control signal (C3) and transmits the third control signal (C3) to the driver 32, and then the driver 32 generates the third drive signal (S3) and transmits the third drive signal (S3) to the third control terminal 219 of the third switch 218. The third switch 218 is consequently conducted.

As a static transfer switch (STS), the second switch 216 prevents occurrence of a spark or arc discharge at the first switch terminal 212 of the first switch 211, which might otherwise short the first switch 211 and cause abnormal activity to occur, at the moment of transient switching of the first switch 211. Moreover, utilizing two anti-parallel connected silicon-controlled rectifiers (or two anti-parallel connected MOSFETs) in the second switch 216 ensures electrical conduction of the phase wire (a) to the first socket terminal 112 in both positive and negative half-cycles of the input voltage (Va). Besides, the third switch 218 is conducted after the socket 111 outputs the output voltage signal and takes place of the function of the second switch 216 for reducing conduction loss caused by the silicon-controlled rectifiers.

Figure 9:
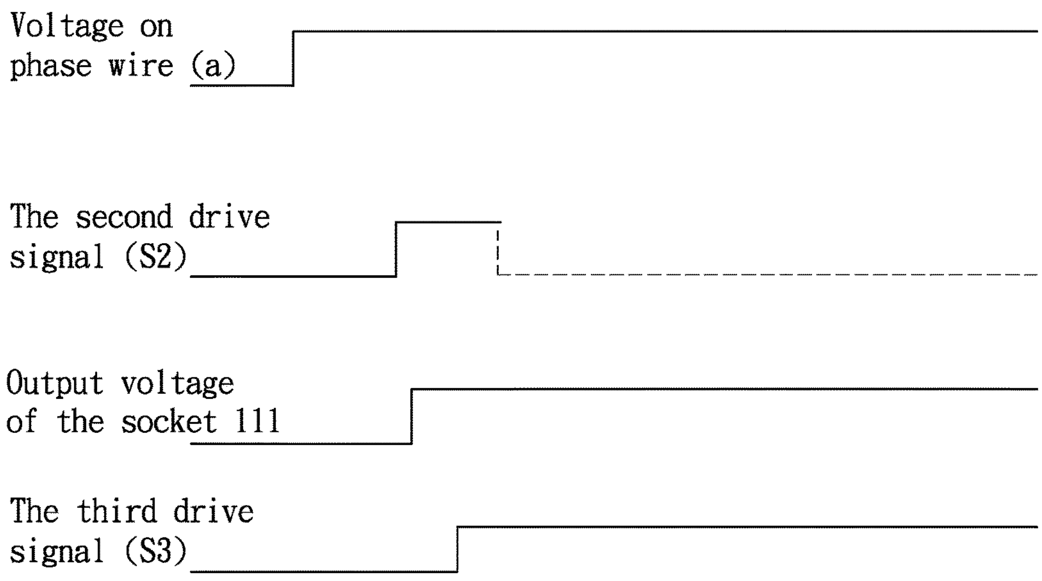

Referring to FIG. 9, another example operation of the third embodiment is illustrated. In this example operation, the second switches 216, 226 and 236 are turned off in response to the second drive signals (S2, S2' and S2") after the third switches 218, 228 and 238 are conducted, respectively. Therefore, power consumption of the second switches 216, 226 and 236 is reduced.

Similarly, the switch unit 22 includes the second switch 226 and the third switch 228. The second control terminal 227 of the second switch 226 is electrically connected to the driver 32 for receiving the second drive signal (S2') therefrom. The third switch 228 is a relay switch, and the third control terminal 229 thereof is electrically connected to the driver 32 for receiving the third drive signal (S3') therefrom. The switch unit 23 includes the second switch 236 and the third switch 238. The second control terminal 237 of the second switch 236 is electrically connected to the driver 32 for receiving the second drive signal (S2") therefrom. The third switch 238 is a relay switch, and the third control terminal 239 thereof is electrically connected to the driver 32 for receiving the third drive signal (S3") therefrom.

At the moment of switching of the first switches 221 and 231, the controller 31 controls the driver 32 to output the second drive signals (S2' and S2") to the second control terminals 227 and 237 respectively of the second switches 226 and 236, so that the second switches 226 and 236 are conducted to prevent occurrence of a spark or arc discharge as the first switches 221 and 231 are switching. After the sockets of the branch units 12 and 13 output the output voltage signals, the controller 31 controls the driver 32 to output the third drive signals (S3' and S3") to the third control terminals 229 and 239 of the third switches 228 and 238, so that the third switches 228 and 238 are conducted to reduce conduction loss.

In summary, the power distribution unit according to this disclosure includes the switch units 21-23. By virtue of the first switches 211, 221 and 231 of the switch units 21-23, one of the line-to-neutral voltages (Van, Vbn and Vcn) and the line-to-line voltages (Vab, Vbc and Vca) can be outputted as the output voltage signal at the sockets of each of the branch units 11-13. Various voltage requirements are satisfied, and the PDU according this disclosure can serve different facilities, and thereby a required number of the PDUs is reduced. Consequently, usage efficiency of the PDU(s) is increased. Furthermore, by virtue of the processing unit 3 automatically controlling the switches 21-23, the user can operate the PDU through different kinds of input approaches, such as the keyboard 61 and the touchscreen module 62 of the user interface 6 and the external device 200 (e.g., the remote computer) coupled to the port 4. Moreover, utilizing the second switches 216, 226 and 236 and the third switches 218, 228 and 238 prevents occurrence of a spark or arc discharge during the transient switching of the first switches 211, 221, and 231, and thereby stability and reliability of operation of the PDU is increased.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A power distribution unit capable of outputting an output voltage signal with various selectable voltages, said power distribution unit configured to be electrically connected to a three-phase electric power source that has three phase wires with respective different phases, said power distribution unit comprising:

at least one branch unit including at least one socket, said at least one socket having a first socket terminal that is configured to be electrically connected to one of the phase wires, and a second socket terminal; and at least one switch unit including a first switch, said first switch including a first switch terminal that is configured to be electrically connected to another one of the phase wires, a second switch terminal that is configured to be electrically connected to a neutral, and a third switch terminal that is electrically connected to said second socket terminal, wherein said first switch is operable to establish one of a first electrical connection between said third switch terminal and said first switch terminal to transmit a line-to-line voltage from the three-phase electric power source to said at least one socket, and a second electrical connection between said third switch terminal and said second switch terminal to transmit a line-to-neutral voltage from the three-phase electric power source to said at least one socket, and said at least one socket is configured to output one of the line-to-neutral voltage and the line-to-line voltage as the output voltage signal.

2. The power distribution unit as claimed in claim 1, wherein said first switch is a manual mechanical switch.

3. The power distribution unit as claimed in claim 1, wherein said first switch is one of a single-pole double-throw switch, a rotary switch and a dual in-line package switch.

4. The power distribution unit as claimed in claim 1, further comprising a processing unit configured to receive an input signal indicating a desired one of the line-to-neutral voltage and the line-to-line voltage, and to generate a first drive signal according to the input signal, wherein said first switch further includes a first control terminal electrically connected to said processing unit for receiving the first drive signal therefrom, and is operable according to the first drive signal to establish one of the first electrical connection and the second electrical connection.

5. The power distribution unit as claimed in claim 4, wherein said processing unit includes:

a controller configured to receive the input signal and to generate a first control signal according to the input signal; and a driver electrically connected to said controller and said first control terminal of said first switch, and configured to receive the first control signal from said controller, to generate the first drive signal according to the first control signal, and to output the first drive signal to said first control terminal.

6. The power distribution unit as claimed in claim 5, wherein said driver is further configured to amplify the first control signal to generate the first drive signal.

7. The power distribution unit as claimed in claim 5, further comprising a port that is electrically connected to said controller, and that is configured to be coupled to an external device which outputs the input signal and to transmit the input signal to said controller.

8. The power distribution unit as claimed in claim 5, further comprising a user interface that is electrically connected to said controller, that is user operable to generate the input signal, and that is configured to transmit the input signal to said controller.

9. The power distribution unit as claimed in claim 8, wherein said user interface includes one of a keyboard, a touchscreen module, and a combination thereof.

10. The power distribution unit as claimed in claim 9, wherein said touchscreen module is configured to display a selection menu having respective options of the line-to-neutral voltage and the line-to-line voltage.

11. The power distribution unit as claimed in claim 5, further comprising at least one output voltage indicator electrically connected to said controller, wherein said controller is electrically connected to said first and second socket terminals of said at least one socket for detecting a detected voltage between said first and second socket terminals, and is further configured to control said at least one output voltage indicator to indicate a voltage value of the output voltage signal according to the detected voltage.

12. The power distribution unit as claimed in claim 11, wherein said at least one output voltage indicator is a light-emitting diode indicator, and is configured to indicate the line-to-neutral voltage and the line-to-line voltage with respective different colors.

13. The power distribution unit as claimed in claim 5, wherein:

said controller is configured to be electrically connected to the three-phase electric power source for detecting the line-to-line voltage and the line-to-neutral voltage outputted by the three-phase electric power source, is electrically connected to said first and second socket terminals of said at least one socket for detecting a detected voltage between said first and second socket terminals, and is configured to generate the first control signal and a second control signal upon detecting the line-to-line voltage and the line-to-neutral voltage outputted by the three-phase electric power source, and to generate a third control signal according to the detected voltage;

said driver is further configured to receive the second and third control signals from said controller, to generate second and third drive signals according to the second and third control signals, respectively;

said first switch is a relay switch, and said at least one switch unit further includes a second switch and a third switch that are electrically connected to each other in parallel and that are configured to be electrically connected between said one of the phase wires and said first socket terminal;

said second switch includes a second control terminal electrically connected to said driver for receiving the second drive signal therefrom, and is configured to be conducted in response to receipt of the second drive signal; and said third switch is a relay switch, includes a third control terminal electrically connected to said driver for receiving the third drive signal therefrom, and is configured to be conducted in response to receipt of the third drive signal after said at least one socket outputs the output voltage signal.

14. The power distribution unit as claimed in claim 13, wherein said driver is further configured to amplify the first control signal to generate the first drive signal.

15. The power distribution unit as claimed in claim 13, wherein said second switch is further configured to be not conducted after said third switch is conducted.

16. The power distribution unit as claimed in claim 13, wherein said second switch includes two silicon controlled rectifiers.

17. The power distribution unit as claimed in claim 13, wherein said second switch includes two metal-oxide-semiconductor field-effect transistors.

* * * * *